(12) United States Patent
Xu et al.

(10) Patent No.: US 10,807,872 B2
(45) Date of Patent: Oct. 20, 2020

(54) GRAPHENE OXIDE QUANTUM DOT, MATERIAL COMPOSED OF SAME AND GRAPHENE-LIKE STRUCTURE, AND PREPARATION METHOD THEREFOR

(71) Applicant: Haibo Xu, Qingdao, Shandong Province (CN)

(72) Inventors: Haibo Xu, Qingdao (CN); Quanzhu Zhou, Qingdao (CN)

(73) Assignee: Haibo Xu, Qingdao (CN)

( * ) Notice: Subject to any disclaimer, the term of this patent is extended or adjusted under 35 U.S.C. 154(b) by 303 days.

(21) Appl. No.: 15/740,337

(22) PCT Filed: Jun. 1, 2016

(86) PCT No.: PCT/CN2016/084254
§ 371 (c)(1),
(2) Date: Dec. 27, 2017

(87) PCT Pub. No.: WO2017/000731
PCT Pub. Date: Jan. 5, 2017

(65) Prior Publication Data
US 2018/0186645 A1     Jul. 5, 2018

(30) Foreign Application Priority Data

Jun. 29, 2015   (CN) .......................... 2015 1 0364756

(51) Int. Cl.
*B32B 9/00*      (2006.01)
*C01B 32/198*    (2017.01)
(Continued)

(52) U.S. Cl.
CPC .......... *C01B 32/198* (2017.08); *C01B 32/184* (2017.08); *C01B 32/194* (2017.08);
(Continued)

(58) Field of Classification Search
CPC ....... C01B 31/04; Y10T 428/30; B82Y 10/00; B82Y 30/00
(Continued)

(56) References Cited

U.S. PATENT DOCUMENTS

| 2013/0102084 | A1* | 4/2013 | Loh ........................ B01J 21/185 |
| | | | 436/94 |
| 2015/0118143 | A1* | 4/2015 | Jeon ....................... C01B 32/194 |
| | | | 423/448 |

(Continued)

FOREIGN PATENT DOCUMENTS

| CN | 101559919 A | 10/2009 |
| CN | 103204494 A | 7/2013 |

(Continued)

OTHER PUBLICATIONS

Extended European Search Report dated Nov. 29, 2018 for counterpart European Patent Application No. 16817095.9.

(Continued)

*Primary Examiner* — Daniel H Miller
(74) *Attorney, Agent, or Firm* — Loza & Loza, LLP; Michael F. Fedrick (57) ABSTRACT

Graphene oxide quantum dots (GOQDs), a composite nanomaterial formed by the GOQDs with graphene and/or graphene-like structure(s), and methods for preparing them are provided. The method for preparing GOQDs comprises providing a carbon-based 3D bulk material having a graphite layer structure as an anode, positioning an end face of the material in contact and parallel with the liquid surface of an electrolyte solution, and intermittently or continuously cutting and exfoliating graphite layers at the end face by electrochemical oxidation to obtain GOQDs. The method for preparing the composite nanomaterial comprises adding powder comprising graphite and/or graphite-like layer structure(s) to a solution of GOQDs; under an assistant mechani- (Continued)

cal action of high shearing force, subjecting the GOQDs adsorbed onto the graphite and/or graphite-like layer structure(s) in the solution to a cycle of exfoliation, re-adsorption, and re-exfoliation, to obtain a composite nanomaterial formed by quasi-zero and/or quasi-two dimensional graphene and/or graphene-like structure(s) and GOQDs.

14 Claims, 4 Drawing Sheets

(51) Int. Cl.
*C09K 11/65* (2006.01)
*C01B 32/194* (2017.01)
*C01B 32/184* (2017.01)
*C25B 1/00* (2006.01)
*B82Y 40/00* (2011.01)
*B82Y 30/00* (2011.01)

(52) U.S. Cl.
CPC ............... *C09K 11/65* (2013.01); *C25B 1/00* (2013.01); *B82Y 30/00* (2013.01); *B82Y 40/00* (2013.01); *Y10T 428/30* (2015.01)

(58) Field of Classification Search
USPC .......................................... 428/408; 423/448
See application file for complete search history.

(56) References Cited

U.S. PATENT DOCUMENTS

| | | | | |
|---|---|---|---|---|
| 2015/0298977 A1* | 10/2015 | Yoon | ...................... | B82Y 15/00 204/157.43 |
| 2016/0017502 A1* | 1/2016 | Santhanam | ............... | C25B 1/00 205/555 |
| 2016/0144348 A1* | 5/2016 | Son | ........................ | B01J 35/004 136/254 |

FOREIGN PATENT DOCUMENTS

| | | |
|---|---|---|
| CN | 103738941 A | 4/2014 |
| CN | 103935998 A | 7/2014 |
| CN | 103935999 A | 7/2014 |
| CN | 104030283 A | 9/2014 |
| KR | 20150065440 A | 6/2015 |

OTHER PUBLICATIONS

Jianhui Deng et al., "Large scale preparation of graphene quantum dots from graphite oxide in pure water via one-step electrochemical tailoring," RSC Advances, 5(38):29704-29707 (2015).
Lei Bao, et al., "Electrochemical Tuning of Luminescent Carbon Nanodots : From Preparation to Luminescence Mechanism," Advanced Materials, 23(48):5801-5806 (2011).
WPI Database, Thomson Scientific, London, GB, AN 2014-V84994, Citation No. XP002786394 (2017).
WPI Database, Thomson Scientific, London, GB, AN 2014-S69308, Citation No. XP002786395 (2017).
WPI Database, Thomson Scientific, London, GB, AN 2015-370048, Citation No. XP002786396.
First Office Action dated Aug. 16, 2019 for counterpart European Patent Application No. 16817095.9, 5 pages.
Chinese Patent Office, Search Report for counterpart CN patent application No. 2015103647569, dated Oct. 26, 2017, 4 pages.
Bourlinos et al., Liquid-Phase Exfoliation of Graphite Towards Solubilized Graphenes, small (www.small-journal.com), 2009, vol. 5, No. 16, pp. 1841-1845.
Lee et al., An amphiphilic pyrene sheet for selective functionalization of graphene, Journal the Royal Society of Chemistry, Chem. Commun., 2011, vol. 47, pp. 8259-8261.
Chinese Patent Office, First Office Action for counterpart Chinese patent application No. 201510364756.9, dated Nov. 24, 2017, 10 pages.
Li et al., Nitrogen-Doped Graphene Quantum Dots with Oxygen-Rich Functional Groups, Journal of the American Chemical Society, Dec. 2, 2011, vol. 134, pp. 15-18.
International Search Report, International Patent Application No. PCT/CN2016/084254, dated Sep. 5, 2016, 2 pages.

* cited by examiner

Fig. 6b

GRAPHENE OXIDE QUANTUM DOT, MATERIAL COMPOSED OF SAME AND GRAPHENE-LIKE STRUCTURE, AND PREPARATION METHOD THEREFOR

CROSS-REFERENCE TO RELATED APPLICATIONS

This application is the U.S. national stage of International Patent Application No. PCT/CN2016/084254, filed on Jun. 1, 2016 and entitled GRAPHENE OXIDE QUANTUM DOT, MATERIAL COMPOSED OF SAME AND GRAPHENE-LIKE STRUCTURE, AND PREPARATION METHOD THEREFOR, which claims the benefit of priority under 35 U.S.C. § 119 from Chinese Patent Application No. 201510364756.9, filed Jun. 29, 2015. The disclosures of the foregoing applications are incorporated herein by reference in their entirety.

TECHNICAL FIELD

Embodiments of the present invention relate to nanomaterials, and in particular relate to graphene oxide quantum dots and a composite nanomaterial formed by the graphene oxide quantum dots with graphene and/or graphene-like structure(s), as well as methods of preparation thereof.

BACKGROUND ART

Graphene is a 2-dimensional (2D) hexagonal planar monolayer of carbon atoms assembled in a honeycomb lattice pattern via $sp^2$ orbital hybridization. Recently, as inspired by graphene, people have started to pay attention to other inorganic compounds characterized by a 2-dimensionally layered crystalline structure, such as metal chalcogenides, boron nitride, graphitic carbon nitride, black phosphorus, transition metal oxides, and the like, and have managed to produce quasi-2D nanostructure systems having a thickness of a molecular scale to several nanometers by physical and chemical methods. Herein the quasi-2D planar materials including graphene are generally referred to as graphene-like structures.

Graphene is currently the thinnest and hardest nanomaterial in the world. It is nearly completely transparent, absorbing only 2.3% of light; has a coefficient of thermal conductivity as high as 5300 W/m·K, higher than that of carbon nanotubes and diamond; has an electron mobility at room temperature greater than 15,000 $cm^2$/V·s, much higher than that of carbon nanotubes or crystalline silicon; and has a resistivity of only $10^{-6}$ Ω·cm, the lowest resistivity of a material currently known in the world, lower than that of copper or silver. Due to its extremely low resistivity, graphene shows an extraordinarily rapid electron transfer speed, and thus has been intended for development of next-generation electronic components or transistors exhibiting a faster electron transfer speed. Graphene is actually a transparent good conductor, very suitable for the manufacture of transparent touchscreens, light plates, and even solar cells. Another important feature of graphene lies in that a quantum Hall effect can be observed therein, and therefore in-depth research thereof has special significance for the development of future electronic devices and manufacture of low-energy consumption high-speed electronic devices.

However, pristine graphene has no band gap, which limits its application in electronic devices such as transistors. In contrast, other graphene-like structured materials exhibit a variety of electric behaviors, and have properties and characteristics different from those of a bulk phase material. As for metal chalcogenides as an example, the bulk material of $MoS_2$ is an indirect gap semiconductor having a band gap of 1.2 eV, while a $MoS_2$ monolayer is a direct gap semiconductor having a band gap of 1.8 eV and can be used for designing and manufacture of transistors. Furthermore, the 2D $Bi_2Te_3$ material also exhibits lower thermoconductivity and higher electroconductivity, and thus better thermoelectrical properties, than its bulk phase material. Nanomaterials having a graphene-like structure can be widely applied to the fields such as electronic devices, photosensitive transistors, and energy storage, because they have controllable type and width of band gap, show better properties than bulk phase materials, and are easier to make into a film than nanomaterials having other numbers of dimensions.

Graphene-like structures can be made by two approaches, i.e. the top-down and bottom-up approaches. The top-down approach utilizes the nature of layered compounds that easily form a flake-like morphology, and separates a monolayer or few-layer thick 2D structure from a bulk phase by weakening the interlayer force in a macroscopic bulk material by a series of means. A representative chemical method of this approach is "liquid-phase exfoliation". The bottom-up approach assembles atomic or molecular structural elements into a 2D nanostructure by utilizing the high anisotropy of the growth of crystal, and includes the methods of "direct chemical synthesis" and "oriented connection". Currently, the method that is applicable to industrial-scale production and can also basically ensure integrity of 2D structures is the liquid-phase exfoliation, using for example organic solvents such as perfluoroaromatics (Bourlinos A B et al., Small, 2009, 5, 1841) or pyrene-based compounds (Lee D W et al., Chem. Commun., 2011, 47, 8259) as an exfoliating agent. However, potential toxicity of the small organic molecules and complexity in their synthesis have limited their large-scale production. Furthermore, using organic solvents having a high boiling point such as N-2-methylpyrrolidone (NMP) or N,N-dimethylformamide (DMF) is problematic because of the difficulty in removal of residual solvents. Even if a suitable solvent is selected, pure solvent-based exfoliation generally has a low yield, and requires addition of inorganic salts, alkali or surfactants to further improve the exfoliation yield, which causes a problem related to removal of impurities.

Graphene oxide quantum dots (GOQDs) are structures having a carbon basal plane less than 100 nm in size, a large number of oxygen- and/or nitrogen-containing functional groups at their edges, and a thickness close to that of a single-atom layer, and are thus considered as a quasi-zero-dimensional nanomaterial. GOQDs show superior dispersibility in water and highly polar organic solvents, and can maintain long-term stability in a solution without precipitation because they present strong electrostatic repulsion. Chinese patent application No. 201410196389.1 discloses use of graphene quantum dots (GQDs) to disperse graphene powder in water, wherein the GQDs were produced from various carbon sources by strong-acid oxidation, two-step oxidation, a hydrothermal method or a solvothermal method. However, GQDs prepared by these methods have a high level of impurities, a broad size distribution, and a low yield, and cannot be produced in a large scale, which limit their applications. Chinese patent application No. 201410196412.7 discloses production of graphene by mechanical exfoliation of natural graphite as the starting material with the assistance of GQDs, using a polar solvent as the dispersant and utilizing the dispersibility of GQDs in the polar solvent and the non-covalent association between graphene layers. It can be seen from its Examples that the GQDs used therein still have the above disadvantages, and thus cannot be widely applied. Chinese patent application No. 201410306607.2 discloses a 2D material obtained by exfoliation of a layered 3D material based on use of GQDs, but does not describe how the GQDs were obtained or what characteristics they had, and therefore the function and effect alleged in this application cannot be reflected. The graphene or the graphene-like 2D material obtained in the above-mentioned patent applications is prone to re-folding during its use, that is, the 2D material turned into a 3D material by packing and lost its 2D material characteristics, which limits its applications; and meanwhile, the GQDs used functioned poorly, cannot achieve efficient exfoliation, led to a low yield, and did not have the cutting ability to obtain graphene or graphene-like 2D materials having a small flake diameter and less layers.

In summary, there is still an urgent demand in the field of nanomaterial to develop high-quality GOQDs and a composite nanomaterial formed by the GOQDs with graphene and/or graphene-like structure(s), as well as methods for preparing them.

SUMMARY OF INVENTION

In order to solve the above technical problems, the objective of the present invention is to provide GOQDs, a composite nanomaterial formed by the GOQDs with graphene and/or graphene-like structure(s), and methods for preparing them. By using the GOQDs of the present invention, under an assistant mechanical action of high shearing force, not only a 3D graphite and/or graphite-like layered material can be dissociated into graphene and/or graphene-like structure(s), but also can be cut into graphene and/or graphene-like structure(s) having a smaller 2D size and even a quasi-zero dimension, and the GOQDs and the graphene and/or graphene-like structure(s) produced can form a stable composite nanomaterial both in a liquid phase and in a solid phase. Such a composite nanomaterial not only maintains the integrity of the 2D structure of these graphene and/or graphene-like structure(s), but also effectively suppresses refolding which is easily seen in applications of 2D materials (i.e. turning into a 3D material), thanks to the GOQDs in the composite.

In order to accomplish the above objective, an embodiment of the present invention provides a method of preparation of GOQDs, comprising the steps of:

providing a carbon-based 3D bulk material having a graphite layer structure, as an anode, and positioning an end face of the carbon-based 3D bulk material having a graphite layer structure (which serves as the working face of the anode) in contact and parallel with the liquid surface of an electrolyte solution; and then intermittently or continuously cutting and exfoliating graphite layers at the end face by electrochemical oxidation to obtain GOQDs, which are dispersed in the electrolyte solution to give a GOQD solution.

According to an embodiment of the present invention, preferably, the above method of preparation specifically comprises the following steps:

providing a carbon-based 3D bulk material having a graphite layer structure as an anode and an inert electrode as a cathode, which are connected to the positive and negative electrodes of a DC power supply, respectively;

immersing (fully or partially) the inert electrode in an electrolyte solution;

positioning an end face of the carbon-based 3D bulk material having a graphite layer structure (which serves as the working face of the anode) in contact and parallel with the liquid surface of the electrolyte solution;

then switching on the power supply (i.e. electrification), and controlling the end face of the carbon-based 3D bulk material having a graphite layer structure such that it intermittently or continuously contacts the liquid surface of the electrolyte solution, to intermittently or continuously cut and exfoliate graphite layers at the end face by electrochemical oxidation to obtain GOQDs, which are dispersed in the electrolyte solution to give a GOQD solution.

In the above method of preparation, preferably, the working zone of the end face of the carbon-based 3D bulk material is from −5 mm below to 5 mm above the liquid level of the electrolyte solution (a negative value means below the liquid level, and a positive value means above the liquid level). Before electrification, the end face is allowed to enter the solution by a depth not more than 5 mm from the liquid surface. After electrification, the liquid surface climbs because of surface tension and the mechanical action of bubbles generated from anode oxidation, and thus the end face is also allowed to work within 5 mm above the liquid surface of the electrolyte solution before electrification.

In the above method of preparation, the selected carbon-based 3D bulk material having a graphite layer structure is a structured body having a regular shape and the layered structure of graphite, and the material preferably includes one of, or a combination of more of, graphite sheets, paper, boards, filaments, tubes, and rods made from natural or artificial graphite, carbon fiber bundles, and structures woven with carbon fiber bundles such as carpets, cloth, paper, ropes, boards and tubes.

In the above method of preparation, preferably, the end face which serves as the working face and is positioned in contact and parallel with the liquid surface of the electrolyte solution is a macroscopic surface at an angle of 60° to 90° with respect to one of the two-dimensional orientations of the microscopic graphite layers of the carbon-based 3D bulk material having a graphite layer structure.

In the above method of preparation, preferably, the electrolyte solution is a solution having an ion-conducting ability and having conductivity not less than 10 mS/cm.

In the above method of preparation, preferably, the electrochemical parameters of the electrochemical oxidation are controlled such that the working voltage of the DC power supply is 5 to 80 V.

In the above method of preparation, the inert electrode is a conductive electrode resistant to corrosion by the electrolyte solution, and preferably made of one of, or a combination of more of, stainless steel, titanium, platinum, nickel-based alloy, copper, lead, graphite, and titanium oxides.

According to an embodiment of the present invention, preferably, the above method of preparation further comprises the step of separating the GOQD solution by a physical and/or chemical method to remove electrolyte(s) and impurities from the solution, so as to obtain a purified GOQD solution. More preferably, the physical and/or chemical method for removing electrolyte(s) and impurities includes one of or a combination of more of filtration, centrifuging, dialysis, distillation, extraction, and chemical precipitation. The purified GOQD solution may be an aqueous solution, or a solution of GOQDs in a polar organic solvent obtained after dehydration, wherein the polar organic solvent may include one of or a combination of more of ethylene glycol, diethylene glycol, ethylenediamine, N-2-methylpyrrolidone, N,N-dimethylformamide and dimethyl sulfoxide.

In the above method of preparation, preferably, the concentration of GOQD in the GOQD solution or in the purified GOQD solution is 0.01 to 10 mg/ml, wherein the GOQDs have a thickness not greater than 2 nm, a 2D-flake diameter of 1 to 100 nm, and an atomic ratio of carbon to oxygen and/or nitrogen of 1:1 to 10:1 (that is, the number of carbon atoms:the number of oxygen and/or nitrogen atoms=1:1 to 10:1).

Another embodiment of the present invention provides GOQDs prepared by the above method of preparation of GOQDs, which have a thickness not greater than 2 nm, a 2D-flake diameter of 1 to 100 nm, and an atomic ratio of carbon to oxygen and/or nitrogen of 1:1 to 10:1 (that is, the number of carbon atoms:the number of oxygen and/or nitrogen atoms=1:1 to 10:1).

Furthermore, an embodiment of the present invention provides a method of preparation of a composite nanomaterial formed by the GOQDs described above with graphene and/or graphene-like structure(s), comprising the steps of:

adding powder comprising graphite and/or graphite-like layer structure(s) to a solution of the GOQDs, followed by thorough mixing, and under an assistant mechanical action of high shearing force, subjecting the GOQDs adsorbed onto the graphite and/or graphite-like layer structure(s) in the solution to a cycle of exfoliation, re-adsorption, and re-exfoliation, to dissociate and cut the powder to generate a composite nanomaterial formed by quasi-zero and/or quasi-two dimensional graphene and/or graphene-like structure(s) and GOQDs, which is the composite nanomaterial formed by the GOQDs with graphene and/or graphene-like structure(s), and dispersed in the solution.

According to an embodiment of the present invention, preferably, the above method of preparation further comprises the step of separating (and washing) the solution containing the composite nanomaterial to remove surplus free GOQDs and residual graphite and/or graphite-like layer structure(s) as well as other impurities, so as to obtain a product, which is a solid phase or dispersed in a liquid phase, containing only the composite nanomaterial formed by quasi-zero and/or quasi-two dimensional graphene or graphene-like structure(s) and GOQDs, i.e. the composite nanomaterial formed by the GOQDs with graphene and/or graphene-like structure(s). The separating (and washing) may include one of or a combination of more of filtration, centrifuging, dialysis, distillation, extraction, and chemical precipitation.

In the above method of preparation, preferably, the solution of the GOQDs may be the GOQD solution or purified GOQD solution as described above. More preferably, the solution of the GOQDs is the purified GOQD solution as described above, and may be an aqueous solution, or a solution of GOQDs in a polar organic solvent obtained after dehydration, wherein the polar organic solvent may include one of or a combination of more of ethylene glycol, diethylene glycol, ethylenediamine, N-2-methylpyrrolidone, N,N-dimethylformamide and dimethyl sulfoxide.

In the above method of preparation, preferably, the powder comprising graphite and/or graphite-like layer structure(s) includes one or more of various carbon materials containing a graphitic phase, metal chalcogenides containing a graphite-like phase, BN, $g$-$C_3N_4$, black phosphorus, and transition metal oxides.

In the above method of preparation, preferably, the mass ratio of the powder comprising graphite and/or graphite-like layer structure(s) to the GOQDs in the solution is not greater than 20:1.

In the above method of preparation, preferably, the means providing the assistant mechanical action of high shearing force includes one of, or a combination of more of, ball-milling, grinding, high-speed stirring and cutting, and (ultra) sonication.

In the above method of preparation, preferably, the duration of the cycle of exfoliation, re-adsorption, and re-exfoliation applied to the GOQDs adsorbed onto the graphite and/or graphite-like layer structure(s) (i.e. the period of treatment under the assistant mechanical action of high shearing force) is not longer than 10 h.

In the above method of preparation, preferably, the prepared composite nanomaterial formed by quasi-zero and/or quasi-two dimensional graphene and/or graphene-like structure(s) and GOQDs has a thickness of 0.7 to 10 nm and a 2D-flake diameter of 1 nm to 10 μm, wherein one or more of GOQDs are distributed on the surface of a quasi-zero and/or quasi-two dimensional graphene and/or graphene-like structure, and a mass ratio of GOQD to quasi-zero and/or quasi-two dimensional graphene and/or graphene-like structure is 0.0001-1:1.

An embodiment of the present invention further provides a composite nanomaterial formed by GOQDs with graphene and/or graphene-like structure(s), which is a composite nanomaterial formed by quasi-zero and/or quasi-two dimensional graphene and/or graphene-like structure(s) and GOQDs, and is prepared by the method of preparation of a composite nanomaterial formed by GOQDs with graphene and/or graphene-like structure(s) as described above, wherein the composite nanomaterial has a thickness of 0.7 to 10 nm, a 2D-flake diameter of 1 nm to 10 μm, and a mass ratio of GOQD to quasi-zero and/or quasi-two dimensional graphene and/or graphene-like structure of 0.0001-1:1.

The principle followed in the present invention is as follows. First, GOQDs are distributed as scattered points on the surface of graphite or graphite-like layer structure(s) by van der Waals force; second, because there is a strong chemical bonding action between the oxygen- and/or nitrogen-containing functional groups of GOQDs and water or a polar organic solvent, GOQDs can be desorbed and dispersed under this action; third, in the adsorbed area on the surface layer, an assistant mechanical action of high shearing force weakens the van der Waals force between the surface layer and the sub-surface layer, and therefore the part of surface layer at or near the adsorbed area is exfoliated together with the GOQD(s) and dispersed in the solution, under the chemical bonding action mentioned above; and last, the new surface exposed after exfoliation undergoes re-adsorption and re-exfoliation until the graphite or graphite-like layer structure(s) are completely dissociated, such that a composite nanomaterial formed by GOQDs with graphene and/or graphene-like structure(s) is eventually produced. Based on this principle, the more the oxygen- and/or nitrogen-containing functional groups of GOQDs are, the less the thickness and the flake diameter will be, and the greater the dispersing and cutting ability of GOQDs will be; and the higher the concentration of the GOQD solution is, the higher the dispersing and cutting efficiency thereof will be.

The GOQDs obtained according to the present invention have a thickness close to that of a single-atom layer, a small 2D-flake diameter, and a large quantity of oxygen- and/or nitrogen-containing functional groups, rendering them with a greater ability of adsorbing, exfoliating, cutting and dispersing graphite or graphite-like layer structure(s) than GOQDs obtained by other methods, and resulting in a composite nanomaterial formed by quasi-zero and/or quasi-two dimensional graphene and/or graphene-like structure(s) and GOQDs. The presence of GOQDs on the surface of the composite nanomaterial renders it with excellent dispersibility in water or in highly polar organic solvents, and the quasi-zero and/or quasi-two dimensional graphene and/or graphene-like structure(s) present on the surface further render it with excellent dispersibility in non-polar organic solvents. More importantly, the composite nanomaterial prepared by this method not only maintains the integrity of the graphene and/or graphene-like structure(s) (i.e. few defects), but also is resistant to refolding. These properties make it very applicable and greatly broaden the window of its application. Furthermore, the preparation methods provided according to the present invention have advantages of high quality, a high yield, and high efficiency, and are suitable for large-scale industrial production.

In summary, the GOQDs, the composite nanomaterial formed by the GOQDs with graphene and/or graphene-like structure(s), and the methods of preparation thereof as provided according to the present invention are advantageous in that the product has a small particle size, less layers, and controllable distribution; the sources of starting materials are rich and less expensive; the production uses simple equipment, has a simple process, low energy consumption, high production efficiency, and little contamination, and is applicable to an industrial scale.

Figure 1:
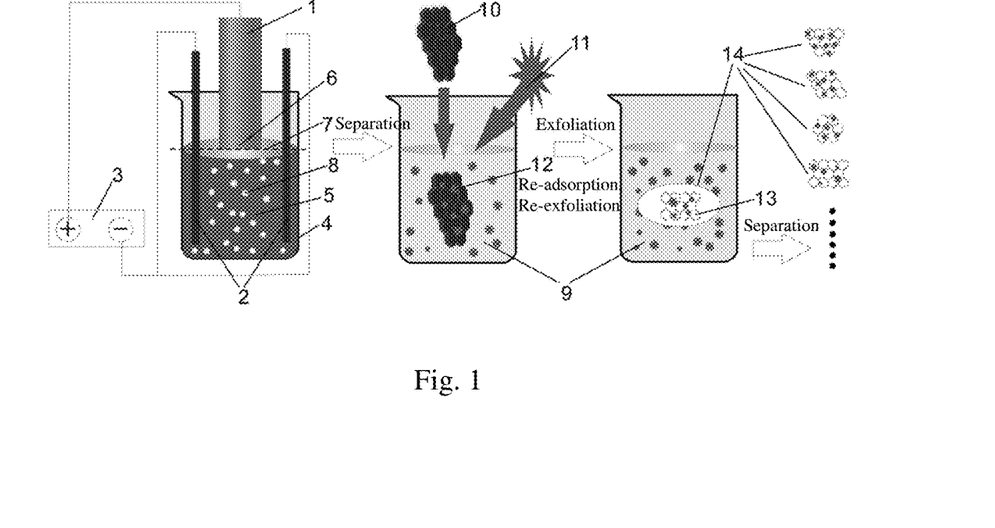
FIG. 1 is a schematic representation of the principle, process and product of the method of preparation of a composite nanomaterial formed by GOQDs with graphene and/or graphene-like structure(s) as provided according to an embodiment of the present invention.

Reference numbers of main components and processes: Anode 1, Cathode 2, DC power supply 3, Electrolytic cell 4, Electrolyte solution 5, End face 6, Liquid surface 7, GOQD 8, GOQD solution 9, Graphite and/or graphite-like layer structure 10, Assistant mechanism 11, Adsorbed GOQD 12, Graphene and/or graphene-like structure 13, Composite nanomaterial 14.

DETAILED DESCRIPTION OF INVENTION

In order to provide a better understanding of the technical features, objectives and beneficial effects of the present invention, the technical solutions of the present invention will be described hereinafter in detail, but are not to be construed as limiting the practical scope of the present invention.

The principle, process and product of the method of preparation of a composite nanomaterial formed by GOQDs with graphene and/or graphene-like structure(s) as provided according to an embodiment of the present invention are illustrated in FIG. 1. The method may specifically comprise the steps of: providing a carbon-based 3D bulk material having a graphite layer structure as the anode 1, and providing an inert electrode as the cathode 2, which are connected to the positive and negative electrodes of a DC power supply 3, respectively; immersing the inert electrode in an electrolyte solution 5 in an electrolytic cell 4; positioning an end face 6 of the carbon-based 3D bulk material having a graphite layer structure, which serves as the working face of the anode, in contact and parallel with the liquid surface 7 of the electrolyte solution before switching on the power supply; then switching on the power supply, and controlling the end face 6 of the carbon-based 3D bulk material such that the end face intermittently or continuously contacts the liquid surface 7 of the electrolyte solution, wherein the working zone of the end face 6 of the carbon-based 3D bulk material is from −5 mm below to 5 mm above the liquid surface 7 of the electrolyte solution (a negative value means below the liquid surface, and a positive value means above the liquid surface); by intermittently or continuously controlling the end face 6 to be positioned within the working zone, intermittently or continuously cutting and exfoliating graphite layers at the end face 6 by electrochemical oxidation to obtain GOQDs 8, which are dispersed in the electrolyte solution to give an electrolyte solution containing GOQDs; then removing electrolyte(s) and impurities from the solution by a physical and/or chemical method to obtain a purified GOQD solution 9; adding powder comprising graphite and/or graphite-like layer structure(s) 10 to the purified GOQD solution, followed by thorough mixing; under an action of high shearing force provided by an assistant mechanism 11, subjecting the adsorbed GOQDs 12 on the graphite and/or graphite-like layer structure(s) in the solution to a cycle of exfoliation, re-adsorption, and re-exfoliation, to dissociate and cut the powder to generate a composite nanomaterial 14 formed by quasi-zero and/or quasi-two dimensional graphene and/or graphene-like structure(s) 13 and GOQDs; finally, separating and washing the mixed solution containing the composite nanomaterial and GOQDs to remove surplus free GOQDs and residual graphite and/or graphite-like layer structure(s) as well as other impurities, so as to obtain a product, which is a solid phase or dispersed in a liquid phase, containing only the composite nanomaterial formed by quasi-zero and/or quasi-two dimensional graphene and/or graphene-like structure(s) and GOQDs.

Hereinafter the technical solutions of the present invention are further explained by specific examples.

Example 1

T300 12K (12,000 single filaments) polyacrylonitrile-based carbon fiber bundles were used as the starting material. Single filaments of the carbon fiber have a diameter of 7 μm, and are composed of microcrystalline graphite layer structures, wherein the orientation of the microcrystalline graphite layers along the fiber axial direction was at an angle of about 80° with respect to the tip face of the carbon fiber. The tip faces of 78 such carbon fiber bundles were cut together such that they were aligned, and these cut bundles were vertically placed above an electrolytic cell containing an aqueous solution of 0.5 M sodium hydroxide and were connected as an anode to the positive electrode of a DC power supply; a SS 304 stainless steel mesh having an area of 100 cm² was fully immersed in the solution and connected as a cathode to the negative electrode of the DC power supply; before electrification, the aligned tip faces of the carbon fiber bundles were carefully adjusted to be in parallel with and just in contact with the liquid surface of the solution, wherein the error of the tip faces entering the solution was acceptable within a range not beyond 5 mm from the liquid level; then the DC power supply was switched on and started to work at a constant voltage controlled at 32 V, a large amount of bubbles were generated at the anode, and liquid climbing was observed under the actions of surface tension and the bubbles generated by anode oxidation, in which case the tip faces of the carbon fibers may also be adjusted to work within a range within 5 mm above the liquid level; with the electrolysis proceeding, the tip faces of carbon fibers were continuously cut and exfoliated, resulting in an increase in the distance between the tip faces and the liquid surface, in which case this distance between the tip faces and the liquid surface may be shortened such that the electrolysis can continuously proceed, or be adjusted to interrupt the reaction and then shortened again to allow contact between the tip faces and the liquid surface such that the electrolysis can intermittently proceed; with the electrolysis proceeding, the microcrystalline graphite layers on the tip faces of the carbon fiber bundles were exfoliated and cut by electrochemical oxidation-induced expansion, and the product was continually dispersed into the solution, resulting in the color of the solution gradually changing from light yellow to bright yellow, then dark yellow, brown yellow, and dark brown over time, corresponding to a gradual increase in the concentration of GOQDs produced, so that an aqueous solution of sodium hydroxide containing GOQDs was obtained; then debris of carbon fibers and sodium hydroxide were removed from the solution by filtration and subsequent dialysis; finally, a solution of GOQDs at a concentration not higher than 10 mg/ml was obtained.

Figure 2A:
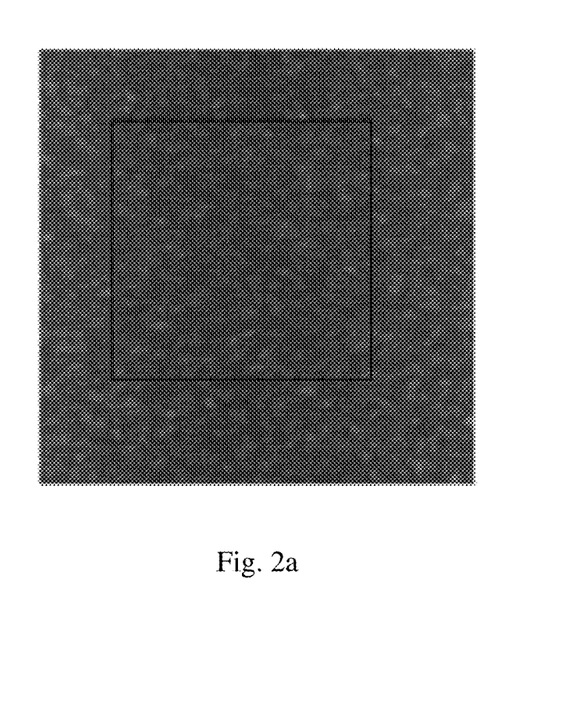
FIGS. 2a and 2b are respectively an atomic force microscope image and a height distribution curve of the GOQDs provided according to Example 1.
Figure 2B:
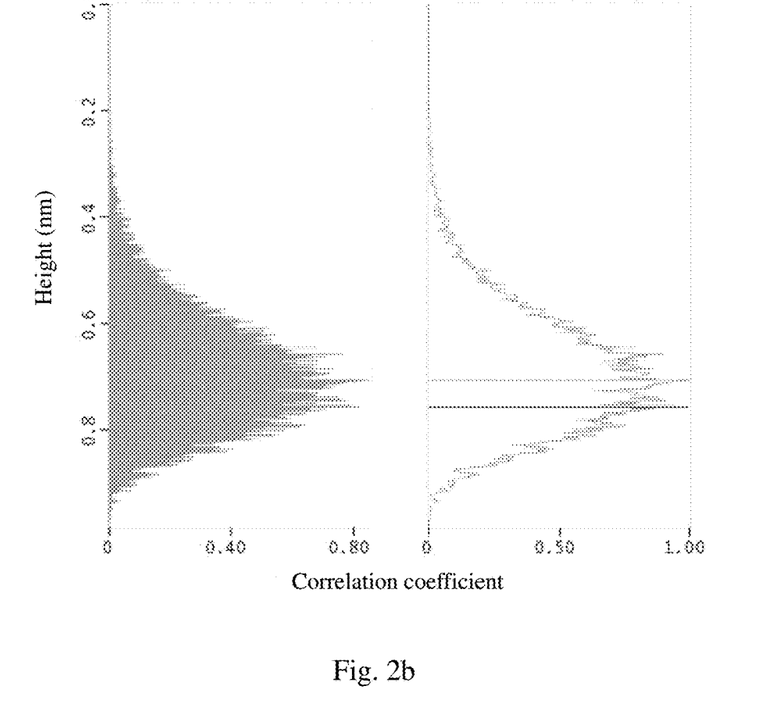
Figure 3:
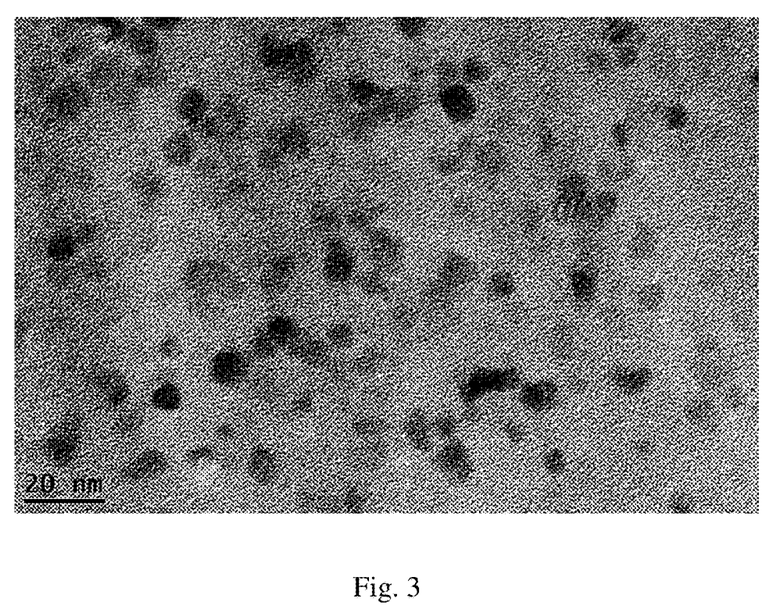
FIG. 3 is a transmission electron microscope (TEM) image of the GOQDs provided according to Example 1.
Figure 4:
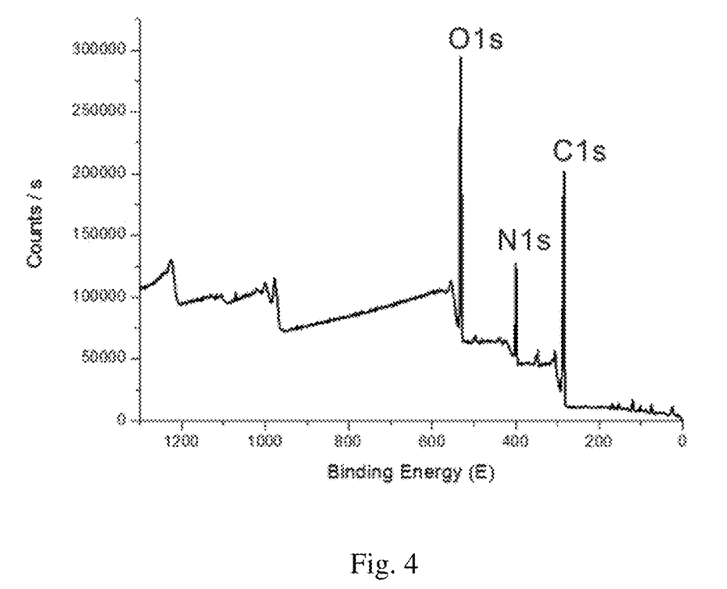
FIG. 4 is the photoelectron spectrum of the GOQDs provided according to Example 1.

The solution of GOQDs obtained above was transferred onto a neat silicon slice, air-dried, and observed with an atomic force microscope. As shown in FIGS. 2a and 2b, the height distribution of the GOQDs is from 0.339 nm to 0.706 nm, and is fairly uniform. The solution of GOQDs obtained above was transferred onto a neat carbon film, air-dried, and observed with a transmission electron microscope (TEM). As shown in FIG. 3, the particle size distribution of the GOQDs was from 3 nm to 10 nm, and the high-resolution inset in the figure shows that the GOQDs were typical monolayer GOQDs. The solution of GOQDs obtained above was freeze-dried to obtain solid-state GOQDs, which were analyzed by photoelectron spectroscopy (XPS). As shown in FIG. 4, the atomic ratio of carbon to (oxygen+nitrogen) is 1:1.

Figure 5:
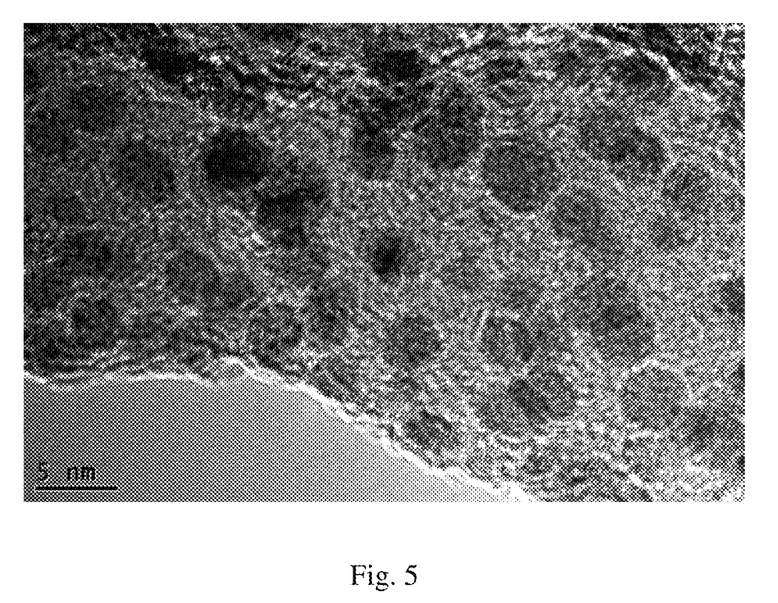
FIG. 5 is a transmission electron microscope (TEM) image of the composite nanomaterial of GOQDs and graphene as provided according to Example 1.

To 1 L of the solution of GOQDs obtained above (10 mg/ml), 20 g powder of expanded graphite was added, followed by thorough mixing under mechanical stirring; under an assistant mechanical action of high shearing force provided by sonication (for sonication, the working frequency was 20 kHz, and the power was 600 W), the GOQDs in the solution were treated for 30 min by a cycle of adsorption onto, exfoliation from, and re-adsorption onto the expanded graphite layer structures, to dissociate and cut the powder of expanded graphite to generate a composite nanomaterial formed by quasi-zero and quasi-two dimensional graphene and GOQDs; then the mixed solution containing the composite nanomaterial and GOQDs was separated by centrifugation and washed for 4 times, to remove surplus free GOQDs and residual power of expanded graphite that was not completely dissociated; the resultant was dried or re-dispersed in pure water to obtain a product containing only the composite nanomaterial formed by quasi-zero and quasi-two dimensional graphene and GOQDs, which was either a solid phase or dispersed in water. FIG. 5 is a transmission electron microscope (TEM) image of the composite nanomaterial formed by the GOQDs and graphene, wherein the graphene is thinner than 10 single-atom layers and has a 2D-flake diameter of 10 nm to 0.5 μm, and the composite nanomaterial has a mass ratio of GOQD to graphene of 0.1:1.

Example 2

Figure 6A:
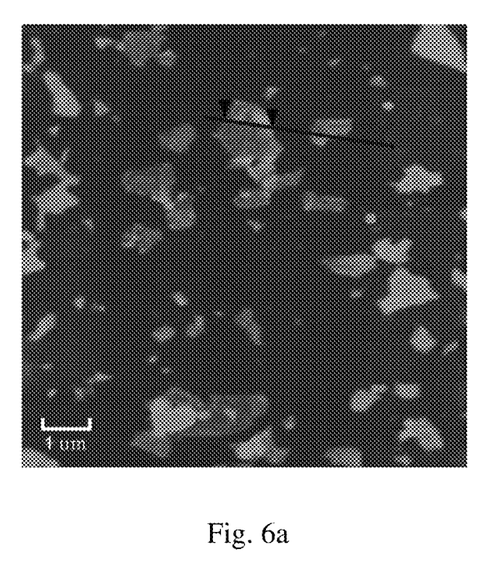
FIGS. 6a and 6b are respectively an atomic force microscope image and a height distribution curve of the composite nanomaterial formed by GOQDs and graphene-like boron nitride as provided according to Example 2.
Figure 6B:
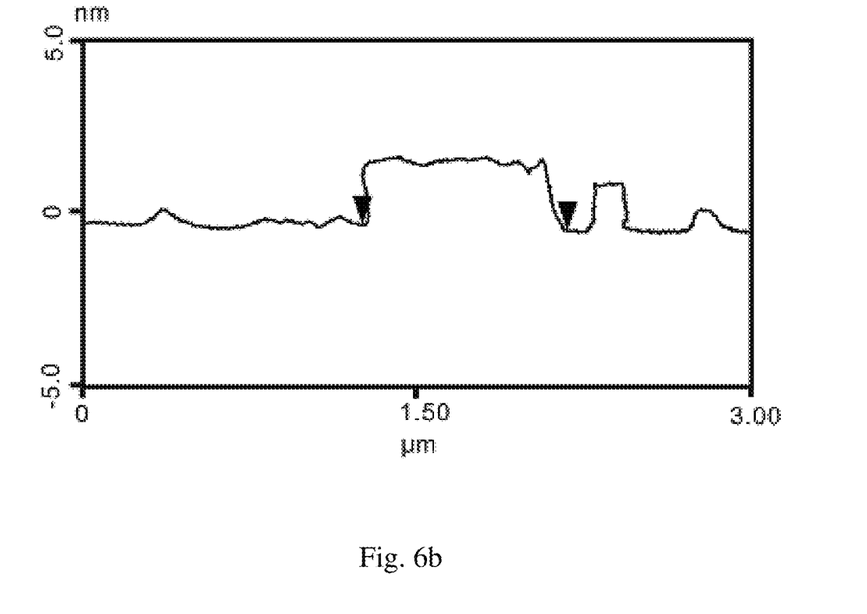

Example 2 differs from Example 1 mainly in that: a 1 mm-thick graphite plate was used as the starting material, and the 2D orientation of its graphite layers was perpendicular to the working end face of the graphite plate anode; the electrolyte solution used was 0.5 M ammonium carbonate; an aqueous solution of ammonium carbonate containing GOQDs was obtained; then graphite debris and ammonium carbonate were removed from the solution by filtration and subsequent pyrolysis, to finally obtain a solution of GOQDs having a thickness less than 2 nm, a particle size distribution in a range of 10 to 25 nm, a carbon/oxygen atomic ratio of 2:1, and a concentration of 2 mg/ml. To 1 L of the solution of GOQDs obtained above (2 mg/ml), 10 g powder of boron nitride was added, and treated by sonication for 2 h (for sonication, the working frequency was 20 kHz, and the power was 600 W), to dissociate and cut the powder of boron nitride to generate a composite nanomaterial formed by quasi-two dimensional graphene-like boron nitride and GOQDs; then the mixed solution containing the composite nanomaterial and GOQDs was separated by vacuum filtration and washed to remove surplus free GOQDs and residual power of boron nitride that was not completely dissociated; the resultant was dried or re-dispersed in pure water to obtain a product containing only the composite nanomaterial formed by quasi-two dimensional graphene-like boron nitride and GOQDs, which was either a solid phase or dispersed in water. FIGS. 6a and 6b are an atomic force microscope image and a height distribution curve of the composite nanomaterial formed by GOQDs and graphene-like boron nitride, wherein the graphene-like boron nitride is thinner than 5 nm and has a 2D-flake diameter of 0.2 to 5 μm, and the composite nanomaterial has a mass ratio of GOQD to graphene-like boron nitride of 0.005:1.

Example 3

Example 3 differs from Example 2 mainly in that: the graphite-like structure used was powder of tungsten disulfide, which was treated by ball milling for 1 h and then by sonication for 1 h (for sonication, the working frequency was 20 kHz, and the power was 600 W), to obtain a product containing only a composite nanomaterial formed by quasi-two dimensional graphene-like tungsten disulfide and GOQDs, which was either a solid phase or dispersed in ethylene glycol, wherein the graphene-like tungsten disulfide was about 2 nm thick and had a 2D-flake diameter of 1 to 9 μm, and the composite nanomaterial had a mass ratio of GOQD to graphene-like tungsten disulfide of 0.01:1.

Example 4

Example 4 differs from Example 1 mainly in that: the graphite-like structure used was powder of tin disulfide; to 1 L of the solution of GOQDs obtained (0.1 mg/ml), 2 g powder of tin disulfide was added, which was treated for 5 h by cutting assisted with a blade rotating at 20,000 rpm, to dissociate and cut the powder of tin disulfide to generate a composite nanomaterial formed by quasi-two dimensional graphene-like tin disulfide and GOQDs; then the mixed solution containing the composite nanomaterial and GOQDs was concentrated by distillation, separated by vacuum filtration and washed for multiple times, to obtain a product containing only the composite nanomaterial formed by quasi-two dimensional graphene-like tin disulfide and GOQDs, which was either a solid phase or dispersed in DMSO, wherein the graphene-like tin disulfide was about 7 nm thick and had a 2D-flake diameter of 3 to 10 μm, and the composite nanomaterial had a mass ratio of GOQD to graphene-like tin disulfide of 0.0007:1.

Example 5

Example 5 differs from Example 1 mainly in that: a 6 mm-thick piece of pitch-based carbon fiber felt was used as the starting material, and an end face of the piece of carbon fiber felt served as the working face and was positioned in contact with the liquid surface of a mixed electrolyte solution of 1.0 M sodium sulfate and 0.1 M sulfuric acid; the microcrystalline graphite layers on the end face were intermittently or continuously cut and exfoliated by electrochemical oxidation to obtain GOQDs having a thickness of 1 to 2 nm, a particle size distribution in a range of 3 to 70 nm, and a carbon/(oxygen+nitrogen) atomic ratio of 5:1. The graphite-like structure used was powder of zinc oxide. To 1 L of the solution of GOQDs obtained (1 mg/ml), 10 g powder of zinc oxide was added, and treated by milling and sonication for 4 h (for sonication, the working frequency was 20 kHz, and the power was 600 W), to dissociate and cut the powder of zinc oxide to generate a composite nanomaterial formed by quasi-two dimensional graphene-like zinc oxide and GOQDs; then the mixed solution containing the composite nanomaterial and GOQDs was subjected to chemical precipitation, filtration and washing, to obtain a product containing only the composite nanomaterial formed by quasi-two dimensional graphene-like zinc oxide and GOQDs, which was either a solid phase or dispersed in ethanol, wherein the graphene-like zinc oxide was 1 to 5 nm thick and had a 2D-flake diameter of 0.4 to 2 μm, and the composite nanomaterial had a mass ratio of GOQD to graphene-like zinc oxide of 0.04:1.

Example 6

Example 6 differs from Example 1 mainly in that: the graphite-like structure used was powder of black phosphorus; to 1 L of the solution of GOQDs obtained (5 mg/ml), 0.5 g powder of black phosphorus was added, which was treated by milling for 1 h and sonication for 2 h (for sonication, the working frequency was 20 kHz, and the power was 600 W), to obtain a product containing only a composite nanomaterial formed by quasi-two dimensional graphene-like phosphorene and GOQDs, which was either a solid phase or dispersed in toluene, wherein the graphene-like phosphorene was less than 10 nm thick and had a 2D-flake diameter of 0.1 to 1 μm, and the composite nanomaterial had a mass ratio of GOQD to graphene-like phosphorene of 0.3:1.

The invention claimed is:
1. A method for preparing a composite nanomaterial formed by graphene oxide quantum dots (GOQDs) with graphene and/or graphene-like structure(s), comprising the steps of:
   adding powder comprising graphite and/or graphite-like layer structure(s) to a solution of the GOQDs, followed by thorough mixing, and
   under an assistant mechanical action of high shearing force, subjecting the GOQDs adsorbed onto the graphite and/or graphite-like layer structure(s) in the solution to a cycle of exfoliation, re-adsorption, and re-exfoliation, to dissociate and cut the powder to generate a composite nanomaterial formed by graphene-like structure(s) and GOQDs, which is the composite nanomaterial formed by the GOQDs with graphene and/or graphene-like structure(s), and dispersed in the solution,
   wherein the graphene-like structure(s) refer to quasi-2D planar materials including graphene; and
   wherein the GOQDs are prepared by a method comprising the steps of:
   providing a carbon-based 3D bulk material having a graphite layer structure as an anode and an inert electrode as a cathode, which are connected to the positive and negative electrodes of a DC power supply, respectively;
   immersing the inert electrode in an electrolyte solution;
   positioning an end face of the carbon-based 3D bulk material having a graphite layer structure in contact and parallel with the liquid surface of the electrolyte solution;
   then switching on the power supply, and controlling the end face of the carbon-based 3D bulk material such that the end face intermittently or continuously contacts the liquid surface of the electrolyte solution, to intermittently or continuously cut and exfoliate graphite layers at the end face by electrochemical oxidation to obtain GOQDs, which are dispersed in the electrolyte solution to give a GOQD solution.

2. The method according to claim 1, wherein the carbon-based 3D bulk material having a graphite layer structure includes one of, or a combination of more than one of, graphite sheets, paper, boards, filaments, tubes, and rods made from natural or artificial graphite, carbon fiber bundles, and structures woven with carbon fiber bundles such as carpets, cloth, paper, ropes, boards and tubes; and
   wherein the end face which is positioned in contact and parallel with the liquid surface of the electrolyte solution is a macroscopic surface at an angle of 60° to 90° with respect to one of the two-dimensional orientations of the microscopic graphite layers of the carbon-based 3D bulk material having a graphite layer structure.

3. The method according to claim 1, wherein the electrolyte solution is a solution having an ion-conducting ability and having conductivity not less than 10 mS/cm; and wherein the electrochemical parameters of the electrochemical oxidation are controlled such that the working voltage of the DC power supply is 5 to 80 V.

4. The method according to claim 1, further comprising the step of:
   separating the GOQD solution by a physical and/or chemical method to obtain a purified GOQD solution;
   wherein the purified GOQD solution is an aqueous solution of GOQDs, or a solution of GOQDs in a polar organic solvent, wherein the polar organic solvent includes one of or a combination of more than one of ethylene glycol, diethylene glycol, ethylenediamine, N-2-methylpyrrolidone, N,N-dimethylformamide and dimethyl sulfoxide.

5. The method according to claim 1, wherein the concentration of GOQD in the GOQD solution or in the purified GOQD solution is 0.01 to 10 mg/ml, wherein the GOQDs have a thickness not greater than 2 nm, a 2D-flake diameter of 1 to 100 nm, and an atomic ratio of carbon to oxygen and/or nitrogen of 1:1 to 10:1.

6. Graphene oxide quantum dots (GOQDs) prepared by the method for preparing GOQDs according to claim 1, having a thickness not greater than 2 nm, a 2D-flake diameter of 1 to 100 nm, and an atomic ratio of carbon to oxygen and/or nitrogen of 1:1 to 10:1.

7. The method according to claim 1, further comprising the step of:
separating the solution containing the composite nanomaterial to obtain a product, which is a solid phase or dispersed in a liquid phase, containing only the composite nanomaterial formed by quasi-zero and/or quasi-two dimensional graphene or graphene-like structure(s) and GOQDs, which is the composite nanomaterial formed by the GOQDs with graphene and/or graphene-like structure(s).

8. The method according to claim 1, wherein the powder comprising graphite and/or graphite-like layer structure(s) includes one or more of: carbon materials containing a graphitic phase, metal chalcogenides containing a graphite-like phase, BN, g-C3N4, black phosphorus, and transition metal oxides; and
wherein the mass ratio of the powder comprising graphite and/or graphite-like layer structure(s) added in the solution of GOQDs to the GOQDs in the solution is not greater than 20:1.

9. The method according to claim 1, wherein the means providing the assistant mechanical action of high shearing force includes one of, or a combination of more than one of, ball-milling, grinding, high-speed stirring and cutting, and sonication; and
wherein the duration of the cycle of exfoliation, re-adsorption, and re-exfoliation applied to the GOQDs adsorbed onto the graphite and/or graphite-like layer structure(s) is not longer than 10 h.

10. The method according to claim 1, wherein the prepared composite nanomaterial formed by graphene-like structure(s) and GOQDs has a thickness of 0.7 to 10 nm, a 2D-flake diameter of 1 nm to 10 μm, and a mass ratio of GOQD to graphene-like structure of 0.0001-1:1.

11. A composite nanomaterial formed by GOQDs with graphene and/or graphene-like structure(s), which is a composite nanomaterial formed by graphene-like structure(s) and GOQDs, and is prepared by the method for preparing a composite nanomaterial formed by GOQDs with graphene and/or graphene-like structure(s) according to claim 1, wherein the composite nanomaterial has a thickness of 0.7 to 10 nm, a 2D-flake diameter of 1 nm to 10 μm, and a mass ratio of GOQDs to graphene-like structure(s) of 0.0001-1:1.

12. The method according to claim 4, wherein the physical and/or chemical method includes one or more steps selected from the group consisting of filtration, centrifugation, dialysis, distillation, extraction, and chemical precipitation.

13. The method according to claim 4, wherein the concentration of GOQD in the GOQD solution or in the purified GOQD solution is 0.01 to 10 mg/ml, wherein the GOQDs have a thickness not greater than 2 nm, a 2D-flake diameter of 1 to 100 nm, and an atomic ratio of carbon to oxygen and/or nitrogen of 1:1 to 10:1.

14. The method according to claim 7, wherein the prepared composite nanomaterial formed by graphene-like structure(s) and GOQDs has a thickness of 0.7 to 10 nm, a 2D-flake diameter of 1 nm to 10 μm, and a mass ratio of GOQDs to graphene-like structure(s) of 0.0001-1:1.

* * * * *